(12) United States Patent  (10) Patent No.: US 8,154,771 B2
Albrecht et al.  (45) Date of Patent: Apr. 10, 2012

(54) TRAINING A USER ON AN ACCESSIBLITY DEVICE

(75) Inventors: Paul Albrecht, Bedford, MA (US); Rafael Maya Zetune, Brighton, MA (US); Lucy Gibson, Belmont, MA (US); Raymond C. Kurzweil, Newton, MA (US); Srivathsan Krishnamachari, Newton, MA (US)

(73) Assignee: K-NFB Reading Technology, Inc., Wellesley Hills, MA (US)

( * ) Notice: Subject to any disclaimer, the term of this patent is extended or adjusted under 35 U.S.C. 154(b) by 1076 days.

(21) Appl. No.: 12/021,925

(22) Filed: Jan. 29, 2008

(65) Prior Publication Data

US 2009/0190838 A1  Jul. 30, 2009

(51) Int. Cl.
  *H04N 1/00*  (2006.01)
(52) U.S. Cl. .................. 358/406; 358/504; 382/181
(58) Field of Classification Search ............ 358/406
  See application file for complete search history.

(56) References Cited

U.S. PATENT DOCUMENTS

| | | | | |
|---|---|---|---|---|
| 5,271,096 A * | 12/1993 | Cook | ............... | 345/604 |
| 5,479,269 A * | 12/1995 | Bronnenberg et al. | ....... | 358/403 |
| 5,510,896 A * | 4/1996 | Wafler | ............... | 358/296 |
| 5,642,202 A * | 6/1997 | Williams et al. | ............. | 358/406 |
| 5,719,965 A * | 2/1998 | Degi et al. | ............... | 382/254 |
| 5,764,383 A * | 6/1998 | Saund et al. | ............. | 358/497 |
| 5,813,771 A * | 9/1998 | Ur et al. | ............... | 400/74 |
| 5,835,241 A * | 11/1998 | Saund | ............... | 358/488 |
| 5,969,795 A * | 10/1999 | Honda | ............... | 355/25 |
| 6,016,207 A * | 1/2000 | Wield | ............... | 358/406 |
| 6,141,464 A * | 10/2000 | Handley | ............... | 382/287 |
| 6,175,428 B1 * | 1/2001 | On et al. | ............... | 358/406 |
| 6,226,419 B1 * | 5/2001 | Lodwick et al. | ............. | 382/294 |
| 6,243,173 B1 * | 6/2001 | Lee et al. | ............... | 358/488 |
| 6,345,763 B1 * | 2/2002 | Matsuda et al. | ............. | 235/459 |
| 6,404,517 B1 * | 6/2002 | Chao | ............... | 358/504 |
| 6,490,369 B1 * | 12/2002 | Beiman | ............... | 382/153 |
| 6,529,616 B1 * | 3/2003 | Rasmussen et al. | ........ | 382/112 |
| 6,643,035 B1 * | 11/2003 | Salgado | ............... | 358/474 |
| 6,816,187 B1 * | 11/2004 | Iwai et al. | ............... | 348/187 |
| 6,972,867 B1 * | 12/2005 | Venable et al. | ............. | 358/1.9 |
| 7,106,477 B2 * | 9/2006 | Horobin | ............... | 358/1.9 |
| 7,280,706 B2 * | 10/2007 | Wu et al. | ............... | 382/275 |
| 7,317,557 B2 * | 1/2008 | Pollard et al. | ............. | 358/448 |
| 7,420,719 B2 * | 9/2008 | Mongeon | ............... | 358/504 |
| 7,436,549 B2 * | 10/2008 | Venable et al. | ............. | 358/1.9 |
| 7,443,546 B2 * | 10/2008 | Chiu | ............... | 358/406 |
| 7,444,035 B2 * | 10/2008 | Wu et al. | ............... | 382/274 |
| 7,623,274 B1 * | 11/2009 | Lefevere | ............... | 358/474 |
| 2003/0025951 A1 * | 2/2003 | Pollard et al. | ............. | 358/505 |
| 2003/0098985 A1 * | 5/2003 | Horobin | ............... | 358/1.9 |
| 2004/0246229 A1 * | 12/2004 | Yamada | ............... | 345/156 |
| 2005/0036038 A1 * | 2/2005 | Wu et al. | ............... | 348/222.1 |
| 2005/0210418 A1 * | 9/2005 | Marvit et al. | ............. | 715/863 |
| 2005/0225808 A1 * | 10/2005 | Braudaway et al. | ........ | 358/3.26 |
| 2006/0056655 A1 * | 3/2006 | Wen et al. | ............... | 382/103 |
| 2007/0002404 A1 * | 1/2007 | Mongeon | ............... | 358/504 |
| 2008/0143838 A1 * | 6/2008 | Nadabar et al. | ............. | 348/187 |

\* cited by examiner

*Primary Examiner* — Sath V Perungavoor (74) *Attorney, Agent, or Firm* — Fish & Richardson P.C.

(57) ABSTRACT

A user of an accessibility device is taught to properly use the device with a test image such that the accessibility device captures the entirety of or a large portion of a test image. In training the user, the device processes test image's information located within the device's field of view. Based on this processed information, the device indicates to the user if the device should be re-positioned such that a larger portion of the test image comes within the device's field of view.

29 Claims, 8 Drawing Sheets

TRAINING A USER ON AN ACCESSIBLITY DEVICE

BACKGROUND

Reading devices use optical character recognition (OCR) and text-to-speech (TTS) i.e., speech synthesis software to read aloud and thus convey printed matter to visually and developmentally impaired individuals. Reading devices read text from books, journals, and so forth.

Reading devices can use commercial off-the-shelf flat-bed scanners, a personal computer and OCR software. The computer processes an image with the OCR software and produces a text file. The text file is fed to text-to-speech synthesis software to provide electrical signals that are fed to audio output devices to render speech and thus read any recognized text aloud to the user.

One manner in which a reading device can capture an image is through an imaging device that is attached to the reading device. One such use is to capture images of a scene to convey content of the scene to a user. A scene can represent contents of an image that is being read. A scene can be a memo or a page of a book, or it can be a door in a hallway of an office building. The type of real-world contexts to "read" may include visual elements that are words, symbols or pictures, colors and so forth.

In addition to processing the image to recognize text, other recognition processes can include object recognition, such as recognizing faces, expressions on faces and so forth.

SUMMARY

According to an aspect of the invention, a method executed in a reading machine, includes comparing an image captured by the reading machine to a known image, computing differences between the captured image and the known image, and calculating a new placement of the reading machine such that the captured image better approximates the known image.

The follow are within the scope of this aspect of the invention.

The method includes producing an indication to inform the user of the new placement of the reader. The method includes determining an order to inform the user of the placement by at least one of a type of difference or a magnitude of difference between the captured image and the known image. The user of the portable reading machine adjusts the placement of the reading machine such that the reading machine's actual placement match the calculated placement. The reading machine automatically detects that it is in teaching mode. The placement includes coordinates relative to the known image in at least one of a X, Y, or Z planar fields. The method placement includes an angle of tilt of the reading machine in at least one of a X, Y, or Z directions. The tilt of the reading machine is determined using an accelerometer.

The known image is at least comprised of words of different sizes. The known image is at least comprised of strings of numbers. The method strings of numbers are located at a top, middle, and bottom of the known image. The method includes recalculating placement until the captured image includes the strings of numbers at the top, middle and bottom of the captured image. The computing differences include performing text recognition on the captured image and comparing text of the captured image to a text of the known image. If text recognition cannot be performed on part of the captured image, the user is advised to check a condition of a lens on the reading machine.

According to an additional aspect of the invention, a computer program product residing on a computer readable medium to train a user on a reading device, the computer program product include instructions to compare an image captured by the reading machine to a known image, compute differences between the captured image and the known image and calculate a new placement of the reading machine such that the captured image better approximates the known image.

Analogous aspects of the method as well as the following are within the scope of this aspect of the invention.

The computer program product includes instructions to render an indication to inform the user of the new placement of the reader. The computer program product includes instructions to determine an order to inform the user of the placement by at least one of a type of difference or a magnitude of difference between the captured image and the known image. The known image is at least comprised of strings of numbers located at a top, middle, and bottom of the known image. The computer program product includes instructions to recalculate placement of the reader until the captured image includes the strings of numbers at the top, middle and bottom of the captured image. The computer program product includes instructions to perform text recognition on the captured image and comparing text of the captured image to a text of the known image. If text recognition cannot be performed on part of the captured image, the computer program product renders an indication to advise the user to check a condition of a lens on the reading machine.

According to an additional aspect of the invention, a portable reading machine includes an image input device for capturing images, a computing device coupled to the image input device, the computing device including a processor to execute instructions; and a computer program product residing on a computer readable medium. The computer program product includes instructions for causing the processor to process the captured images to, compare the captured image to a known image, compute differences between the captured image and the known image and calculate new placement coordinates of the reading machine such that the captured image better approximates the known image.

Analogous aspects of the method as well as the following are within the scope of this aspect of the invention.

The computer program product of the reading machine includes instructions to inform a user of the calculated placement coordinates. The computer program product of the reading machine includes instructions to calculate current placement coordinates of the reading machine relative to the known image, and inform the user of the calculated placement coordinates in an order determined by at least one of a type of difference or a magnitude of difference between the captured image and the known image. The computer program product of the reading machine includes instructions to automatically detect that the reading machine is in training mode. The known image is at least comprised of strings of characters, the strings of character located at a top, middle, and bottom of the known image. The computer program product of the reading machine includes instructions to recalculate the placement coordinates until the captured image includes the strings of numbers at the top, middle and bottom of the captured image. The computer program product of the reading machine includes instructions to recalculate the placement coordinates by determining if the numbers at the top, middle or bottom of the known image are missing from the captured image. The computer program product of the reading machine includes instructions to perform text recognition on the captured image and comparing text of the captured image to a text of the known image. The computer program product of the reading machine includes instructions to recalculate the placement coordinates, if text recognition cannot be performed on part of the captured image, such that the captured image includes more of the known image. If text recognition cannot be performed on part of the captured image, advise the user to check a condition of a lens on the reading machine. The known image is provided from capturing the image from a glossy, laminated sheet containing strings of characters, the strings of character located at a top, middle, and bottom of the laminated sheet.

According to an additional aspect of the invention, an apparatus for training a user how to use a reading machine includes a sheet including at least three strings of numbers printed across spaced portions of a top, middle and bottom of one surface of the page and strings of characters of different sizes printed across the opposing surface of the page; and with one corner of the page diagonally cut off.

One or more aspects of the invention may provide one or more of the following advantages.

Provided is a training mode and apparatus for an accessibility device that can be used as reading device. A test image on a test page is positioned within the field of view of a image input device on the reading device 10 and recognition software teaches a user how to position the reading device such that a large portion of the test image is within the reading device's field of view. This is especially important to blind and/or visually impaired individuals.

The test image is a sheet, e.g., paper, a plastic film, and so forth containing unique information that is unlikely to appear in other contents, allowing the reading device to uniquely identify the image as a test image and automatically enter training modes. Additionally, by comparing the unique information contained in the reader's field of view to unique information stored in the reader, the reader determines if any of the unique information is missing from its field of view, determiner how the placement of the reading device should be adjusted and conveys this information to the user.

DETAILED DESCRIPTION

Figure 1:
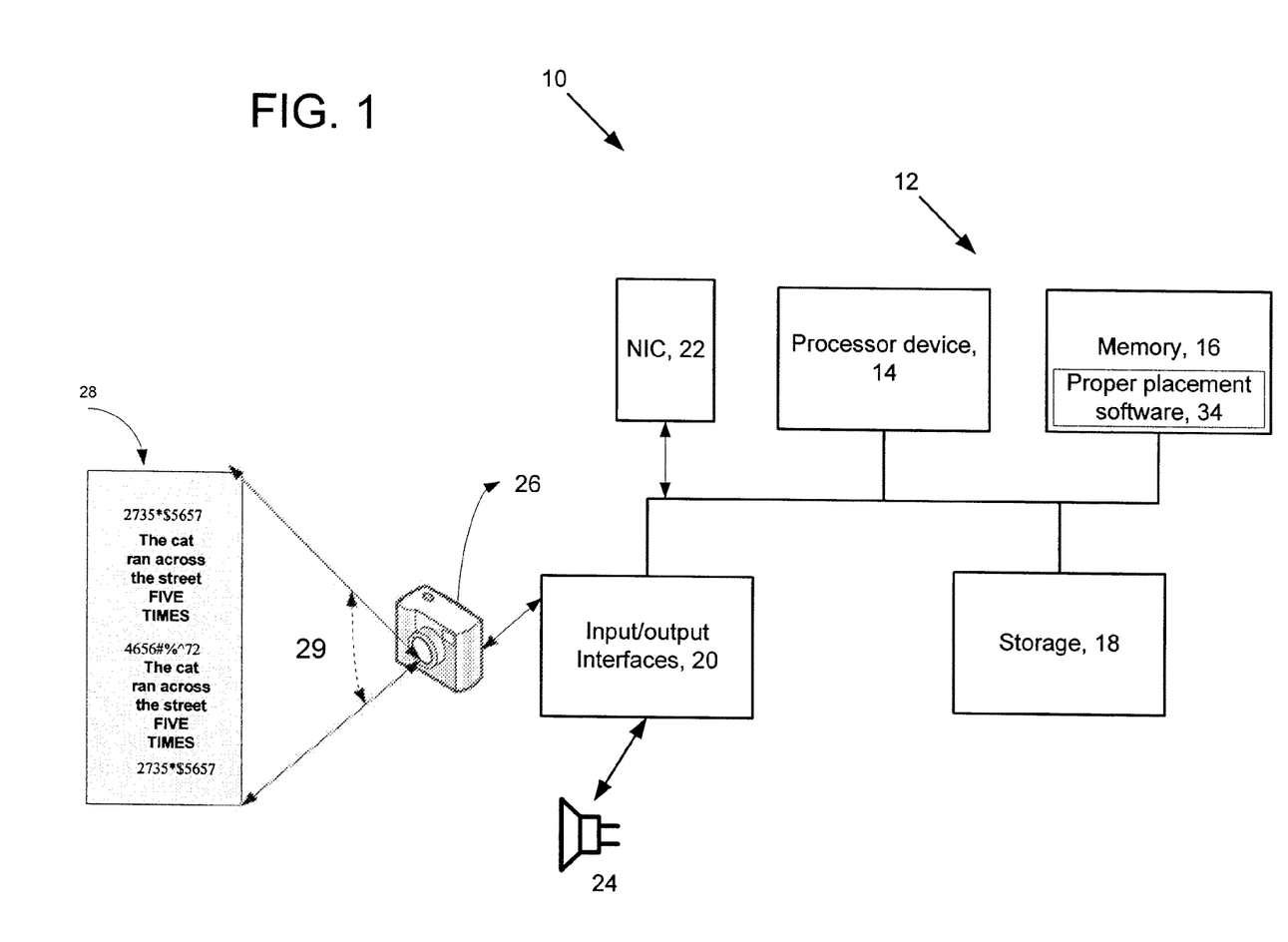
FIG. 1 is a block diagram of a portable reading device with attached, portable imaging device, and a test image.

Referring to FIG. 1, an accessibility device 10 includes a portable computing device 12 and an image input device 26. In some instances, the accessibility device 10 is referred to as reading device. As shown, the image input device 26 is separate from the reading device 10. The image input device can be a camera, video camera, portable scanner, or built-in camera on a cell phone. In some embodiments, the image input device 26 is integrated into the reading device 10. For example, the reading device 10 is a camera with enhanced computing capability that implements the functions of the computing device 12. In some examples, the reading device 10 is a mobile telephone, e.g., smart phones such as the Nokia N95 (Nokia, Inc.), having the image input device and enhanced computing resources. Such a smart phone is modified to have the computing resources execute application software that implements reading device functionality.

The image input device 26 collects image data that is processed by the computing device 12. The reading device 10 has the image input device 26 coupled to the computing device 12 using a cable (e.g. USB, Firewire) or by wireless technology (e.g. Wi-Fi, Bluetooth, wireless USB). In one example, a consumer digital camera is coupled to a pocket PC or a handheld Windows or Linux PC, a personal digital assistant which executes applications to implement reading device functionality.

In general, as shown in FIG. 1, the computing device 12 of the reading device 10 includes at least one processor device 14, memory 16 for executing computer programs and persistent storage 18, e.g., magnetic or optical storage, PROM, flash Prom or ROM and so forth that persistently stores computer programs and other data used by the reading device 10. In addition, the reading device 10 includes input and output interfaces 20 to interface the processing device to the outside world, such as to the image input device and user controls.

The portable reading device 10 includes a network interface, device (not shown) to interface the reading device to a network (including the Internet), e.g., to upload programs and/or data used in the reading device 10. As a mobile phone, the phone can connect to the Internet, via a wireless carrier or to a local network via WiFI and Bluetooth. The network connectivity is useful for cooperative processing, in which the mobile device captures an image and pre-processes the image to produce smaller bitmaps that are sent to a more powerful computer for recognition processing. The recognized text (or object) information is sent back to the mobile device.

The reading device 10 includes an audio output device 24 to convey synthesized speech to the user from operation of the reading device 10. In some examples, the camera and audio devices are coupled to the computing device using a cable (e.g. USB, Firewire) or using wireless technology (e.g. Wi-Fi, Bluetooth) etc. In some embodiments, the reading device 10 has two cameras, or video input devices 26, one for high resolution and the other for lower resolution images. The lower resolution camera supports lower resolution scanning for capturing gestures or directed reading, whereas the higher resolution one captures images that are processed to recognize text and which text is used to synthesize speech.

As also shown in FIG. 1, a test image 28 is positioned within the field of view 29 of the image input device 26 on the reading device 10. Proper placement recognition software 34 is used to teach a user how to position the reading device 10 such that a large portion of the test image 28 is within the reading device's field of view 29.

Figure 2:
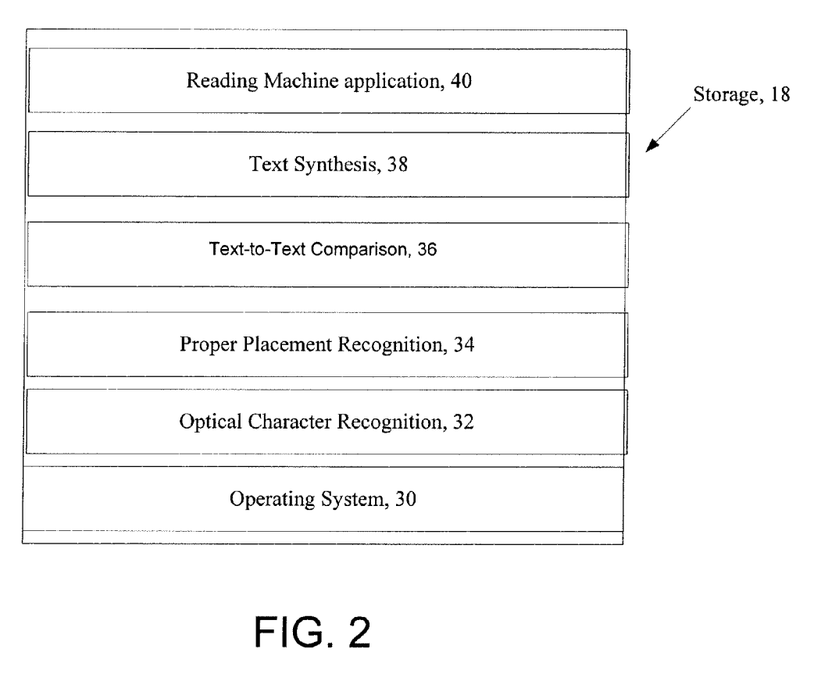
FIG. 2 is a block diagram of functions executed on a reading device.

Referring to FIG. 2, the following functions residing in storage 18 and are executed in memory 16 under control of the processor 14 and an operating system 30, in addition to the proper placement recognition software 34, mentioned above; optical character recognition software 32 (or object recognition software), text-to text comparison software 36, text-to-speech-synthesis software 38 and a reading device application 40 that accesses these software modules. In some examples, the reading device application 40 includes other more advanced functions and operates under different modes of operation as desired.

The Test Image

The test image 28 is a sheet of, e.g., paper, (or a plastic film, and so forth) containing information, such as objects or text, or a combination of both. In other examples, the test image 28 is multiple images, such as a live video. The test image 28 contains unique information, information that is unlikely to appear in other contents, allowing the reading device 10 to uniquely identify the image as a test image, as discussed below. Additionally, by comparing the unique information contained in the reader's 10 field of view 29 to unique information that is stored in the reader, the reader 10 determines if any of the unique information is missing from its field of view 29 and accordingly how the placement of the reading device 10 should be adjusted.

In some examples, the unique information is located at multiple places on the test image 28, demarcating the different regions of the test image 28. In one example, the unique information is located at the top, middle and bottom portions of the test image 28. In this example, the unique information is a combination number and character string, unlikely to appear in other contexts, and thus are cumulatively referred to as the "unique strings." For example, referring to FIG. 3, the test image 28 contains the number and character string "2735*$5657" at the top 50 and bottom 54 of the image 28. An alternate character string, such as "4656#%^72," is located in the middle 52 of the image 28. In some examples, the test image 28 also contains words and sentences 62 between the unique strings to ensure that the reader 10 correctly performs text recognition. In other examples the unique strings can be numeric strings such as a series of digits, chosen to minimize OCR confusion with letters. For instance, the number "0" (zero) would not be included in the unique string because it could be confused with the letter "O." Other examples of numbers to be avoided, include the number "1" (one) to be confused with the letter "L" and so forth.

Other strings could be for instance, a base string, e.g., "222-333-222", and each line would have a different ID (01, 02, 03, etc). In this example, the strings are the same, and only the ID's are different (e.g. 222-333-222-05). If any base string is found on the page, the reader would indicate that the training page was detected. However, only if the string with the ID that is located in the middle of the page is found, then the instructions are given out to correct the position. This helps finding the training page even if the image is cut off.

Training Mode

The reading device 10 is in training mode when it teaches a user on its proper use. Training mode differs from the device's 10 other operative modes, such as the mode in which the device 10 processes images and renders speech describing said images. In training mode, the device 10 instructs a user how best to hold the device 10 relative to the test image 28 such that the device's 10 field of view 29 captures a large portion of the test image 28.

Figure 4:
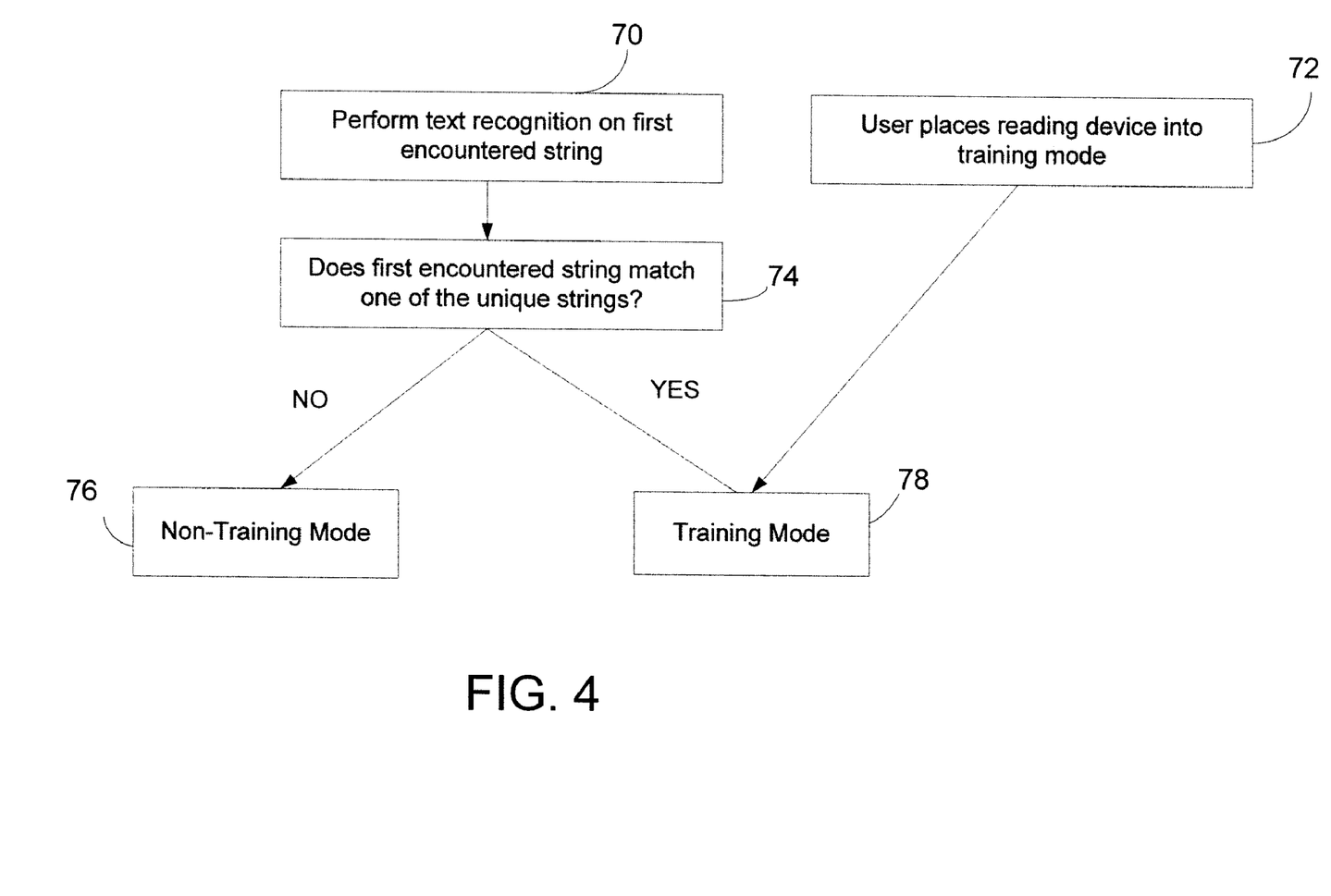
FIG. 4 is a flow chart of the ways in which a reading device enters training mode.

Referring to FIG. 4, the reading device 10 is placed into training mode 78 in numerous way. The user places the device into training mode 72 by pushing a dedicated "training mode" button on the device 10 (not shown) or by executing a series of machine commands, either verbal or using a graphical user interface located on the reading device 10. In other examples, the device 10 enters training mode 78 the first time it is turned on. In this example, it is assumed that a brand-new user of the reading device 10 needs to be trained on its proper use.

Another option for entering training mode would occur if only a certain number of unique strings are found, not only if the first unique string is found. In this mode, the reader could indicate that the training page was detected with the first string, but the reader warns the user that an insufficient number of identifiers were found, and therefore, no extra instructions to correct the orientation of the page would be given. That is the reader would report the training page results unless it finds more than one unique string (the one in the middle of the page). It will only report that the training page was detected; however, if may later report that it didn't have enough identifiers to calculate the results to be reported.

Figure 3:
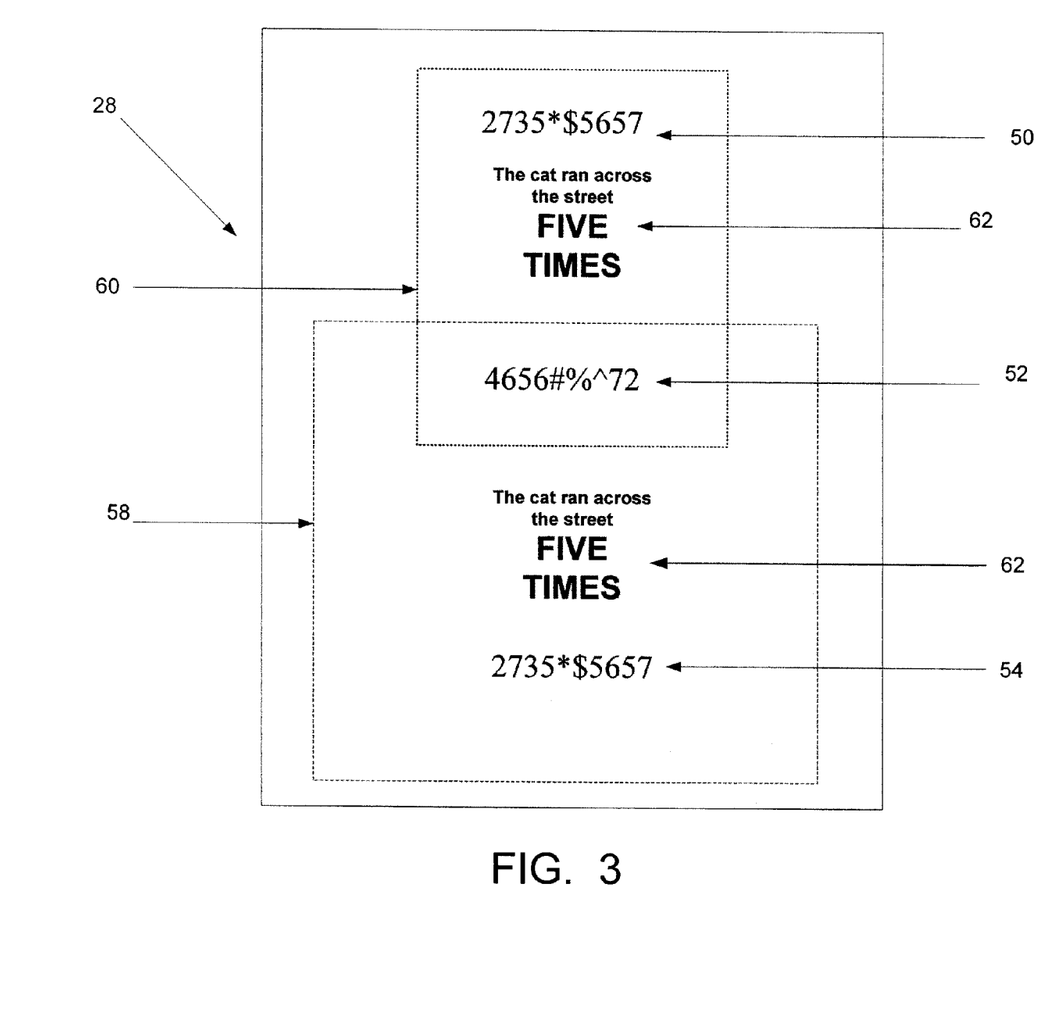
FIG. 3 is an example test image.

In other examples, the reading device 10 enters training mode 78 whenever it detects the test image 28, by performing text or object recognition on images captured by the reading machine 10 and recognizing unique strings 50, 52, and 54 as shown in FIG. 3. In some instances, the reading device 10 performs an initial check for the unique strings. When the device 10 is activated, it performs text recognition on the first string of characters or objects ("first encountered string") it detects 70 as shown in FIG. 4. To ascertain if the first encountered string is a unique string, the first encountered string is compared to the known unique strings, as illustrated in step 74. If a match exists, the device 10 enters training mode 78. Conversely, if a match does not exist, the reading device 10 ascertains that the image in its field of view 29 is not the test image 28.

In some instances, the device 10 does not detect that it is in training mode 78, and thus reading a test image 28 until after the text recognition process has begun. For example, as shown in FIG. 3, in some embodiments, text 62 is located between the unique strings 50, 52 and 54. If the field of view 29 contains text 62 followed by the middle unique string 52, the first encountered string is not a unique string and thus the device 10 does not recognize the image as the test image 28. The device may start reading the text. The device 10 however enters training mode 78 when it encounters the middle unique string.

Determining the Unique Strings Missing from the Field of View

Figure 5:
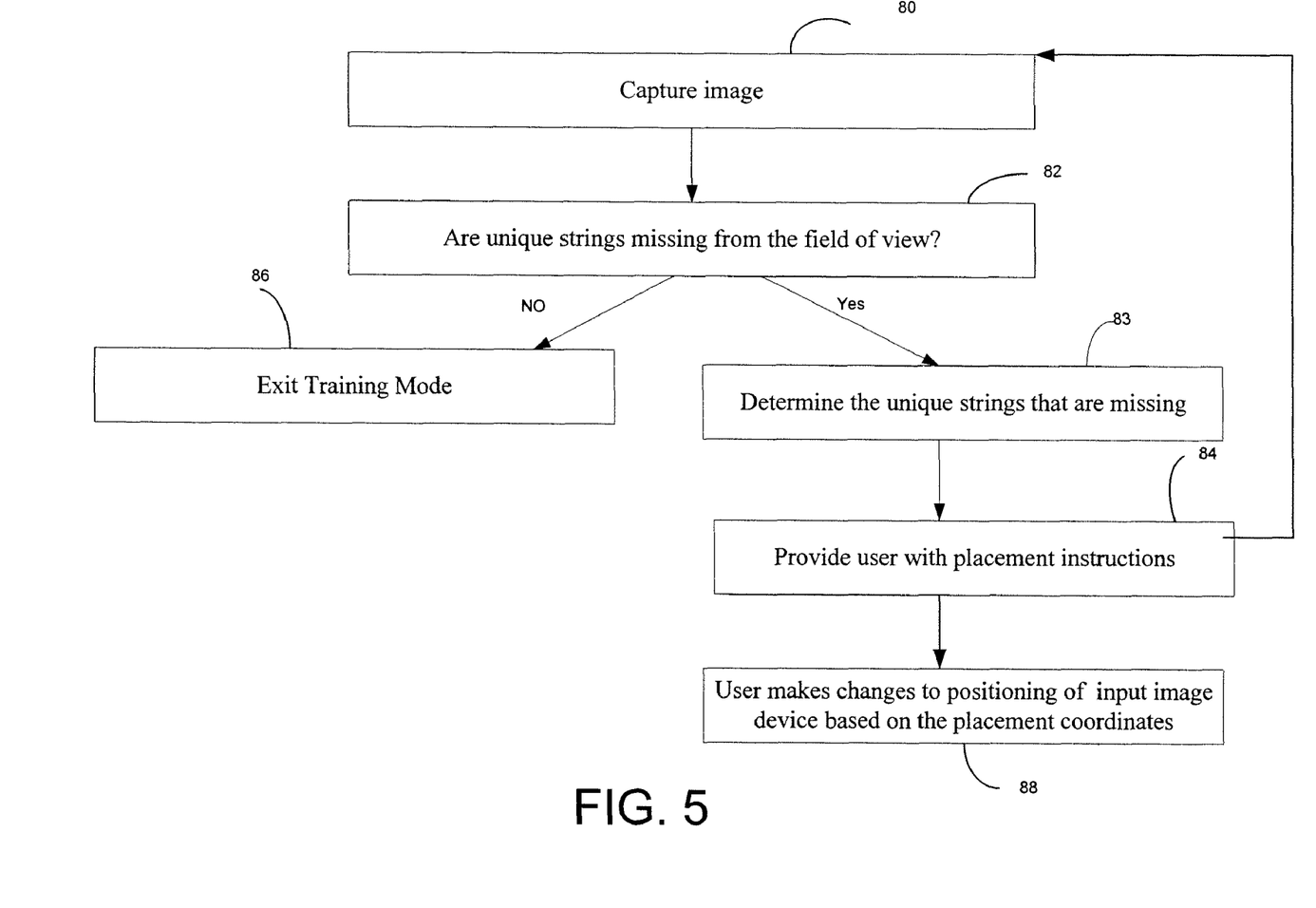
FIG. 5 is a flow chart of training process.

Referring to FIG. 5, once the device 10 has entered training mode 78, the device analyzes if the image it captured 80 in its field of view ("the captured image") reflects the information on the test image 28. In some embodiments, the unique strings are a proxy for whether the test image 28 is adequately within the device's 10 field of view 29. If the captured image contains all three of the unique strings 82, then the device 10 is properly placed relative to the image 28 and the reader 10 exits training mode 86. When the reading device's 10 field of view 29 includes all three unique strings, the device 10 is capturing a large potion of the test image 28 and is thus being properly held. However, when the captured image does not contain all three unique images then the device 10 ascertains the unique strings that are missing, as illustrated in step 83.

To determine those portions of the test image 28 that are outside the reader's 10 field of view 29, the reader 10 determines the portions of the test image 28 that are in its field of view 29 by performing optical character recognition 32 on the captured image, creating a text file version of the captured image ("captured text file"). By comparing information contained within the reading machine's 10 field of view 29 with the test image's 28 known information using the text-to-text comparison software 36, the device 10 determines those portions of information that are outside its field of view 29 as shown in step 80.

In some examples, in carrying out this process, the reading device 10 performs text recognition on the first encountered string. As previously discussed, this string is compared to the test image's 28 known unique strings. The reading device 10 performs text recognition on substrings, such as when part of the unique string is outside the reading device's 10 field of view 29. For example if the reading device 10 captures "#%^72," which is part of the middle string 52, and not the full middle string "4656#%^72" 52, the reader 10 performs text recognition on the substring, the "#%^72," and compares this substring to the middle unique string 52, finding that the leftmost portion of the string is cut off.

The number of comparisons between the first encountered string and the unique strings depends on the number of different unique strings. For example, if the top, middle and bottom unique strings are all different, three comparisons are performed on the first encountered string. Analogously, if the top and bottom strings are identical as shown in FIG. 3, with only the middle string differing, two comparison are performed on the first encountered string: the first encountered string is compared to either the top or bottom string and the middle string.

Even if the test image 28 is upside down relative to the reading device 10, the reading device 10 still detects the presence of the unique strings. This is because text recognition recognizes upside down text and interprets this text as though it were not upside down (essentially flipping the image). In some embodiments, the reading device 10 alerts the user that the test image 28 is upside down. Additionally, in some embodiments, the user is only alerted once, and not continuously, because the upside down nature of the test image 28 does not affect the reading device's 10 ability to properly train a user.

To ensure that the reader accurately ascertains the missing portions of the test image, the string in the middle 52 of the test image 28 differs from the strings at the top 50 and bottom of the page 56. For example, if the string at the top, middle and bottom of the test image 28 are the same, such as "2735*$5657," and two of the strings are in the reader's 10 field of view 29, the reader 10 is not able to determine whether the two strings are the top and middle strings or the middle and bottom strings.

Instead, if the field of view 58, 60 includes one string "2735*$5657" 54 and one string "4656#%^72" 52, the reader ascertains the portion of the page that is being cut off by the placement of the strings relative to one another. For example, if the middle string 52 is above the bottom string 54 in the field of view 58, then the reader ascertains that the top string is missing, and therefore the top portion of the page is cut off. Alternatively, if the field of view 60 covers the top potion of the page 56, the reader again views two strings, the top string and the middle string 52. By performing text recognition on the 2735*$5657, the reading device ascertains that this string represents either the top or the bottom string. By performing text recognition on the 4656#%^72 string, the reading device ascertains that this string is the middle string. Then, using the spatial characteristics of the 2735*$5657 string relative to the middle string, the reading device ascertains that the 2735*$5657 is above the middle string, and thus the field of view 60 is of the upper portion of the page.

In some embodiments, the strings of text or objects located on the test image 28 are all unique, allowing the reading device to match the text located in the captured image with the text located on the test image 28 without reference to the location of the text. For example, if the top string is "3w459#$&" and the middle string is "4646#%$^3" and the bottom string is "564#^2," and the reader 10 detects the "3w459#$&" string, then the reader 10 compares the viewed text with the known text on the page to determine that the middle and bottom portions of the page are not being captured.

Instructing the User on Device Placement

Referring to FIG. 5, if the captured image does not contain all of the unique strings, the proper placement recognition software 37 calculates 83 new placement coordinates of the reading device 10, such that the next captured image contains more of the unique strings and thus more fully captures the test image 28. The user is provided with the new placement coordinates 84, the user makes changes 88 to the positioning of the reading device 10 based on the placement coordinates 84, and the test image 28 is re-captured and process is repeated as necessary.

In some examples, the proper placement of the reading device 10 relative to the test image 28 is dependent on two coordinate sets: distance parameters and angle of tilt ("tilt") parameters. The distance parameters describe the distance from the reading device 10 to the test image in the three planar fields of direction: the X direction, the Y direction and the Z direction. The tilt parameters describe the tilt of the reading device 10 relative to the test image 28 in the X direction, the Y direction and the Z direction. In some examples, these tilt parameters alert the user of the reading device 10 if their hand is unsteady. An unsteady hand results in tilt in the Z-direction, a condition referred to as the "jitters." Such a jittery hand negatively impacts the ability of the reading device 10 to properly perform text recognition, since the captured image is blurred, making text recognition more difficult. In some embodiments, an accelerometer can be used to measure tilt rather than determine tilt from processing of the image.

The proper placement recognition software 34 calculates the device's current placement coordinates and new placement coordinates based on the properties of depth perception and the length and width of the test image 28. For example, if the bottom portion of the test image 28 is omitted from the captured text file, the proper placement recognition software calculates how much higher the device 10 should be placed relative to the test image such that the entire image is captured. Additionally, based on the text-to-text comparisons 36, the proper placement recognition software 34 calculates whether the device 10 needs to be moved right, left, up, down or rotated a certain amount.

Figure 6:
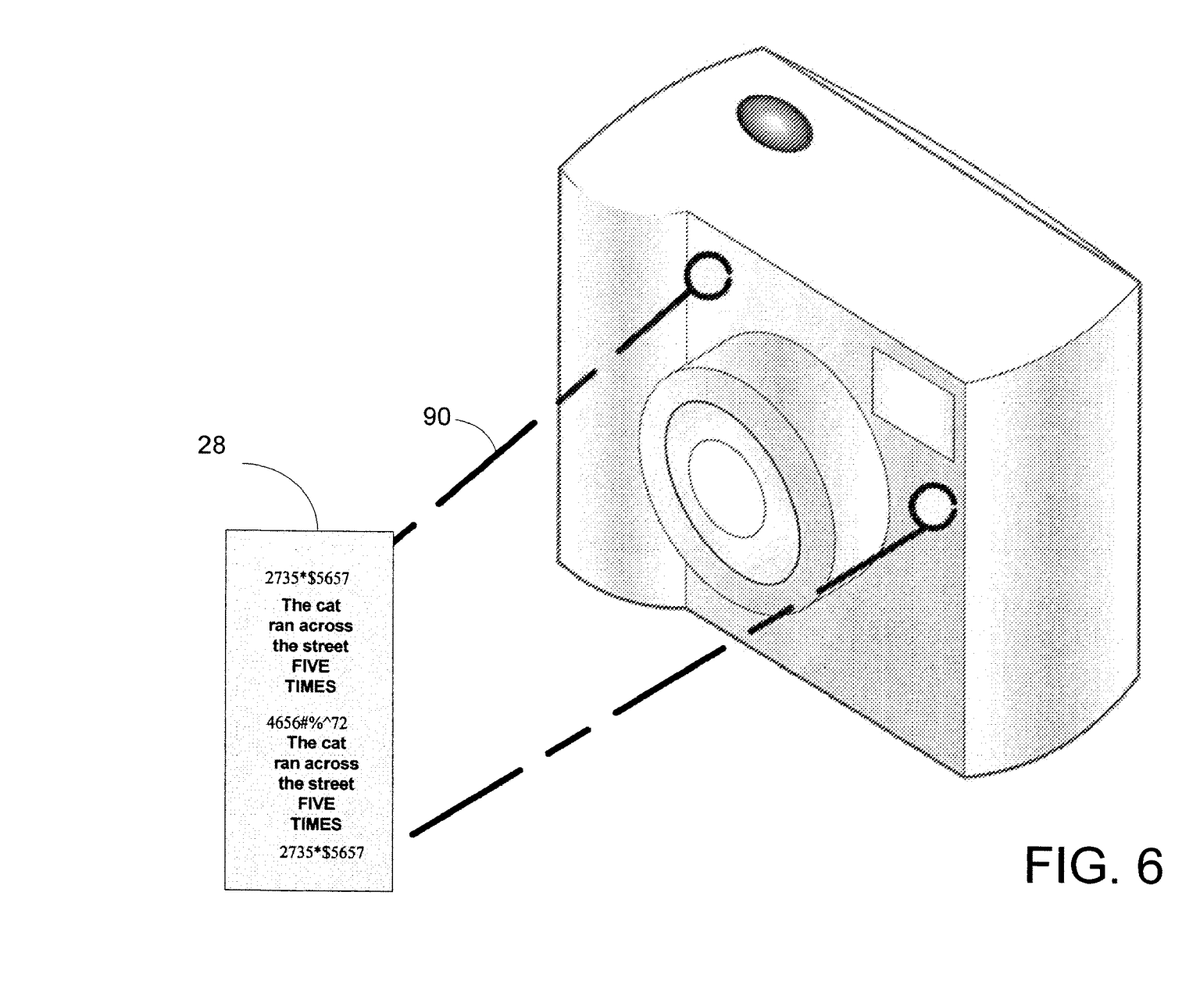
FIG. 6 is an example of a laser embedded within a reading device.

Referring to FIG. 6, in some examples, a laser 90 is embedded within the reading device 10 and detects the distance to the surface of the test image 28 such that the user is instructed on how to better hold the device 10.

In some examples, specifically, the reading device determines its coordinates in terms of distance to the test image and tilt relative to the test image. This process is referred to as the "current reading." The current reading produces values for the six coordinates: the X, Y and Z distance coordinates and the X, Y and Z tilt coordinates. Collectively, these coordinates are referred to as the current reading coordinates. Then, the values of the current reading coordinates are compared to the values of the baseline coordinates. The difference between the current reading coordinates and the baseline coordinates are referred to as the coordinate differential. This comparison yields six coordinate differentials. For each baseline coordinate, a range of acceptable values exists. For example, if the value of the baseline coordinate in the Y-distance direction is 16 inches, meaning that the reading device should be 16 inches above the test image, then a range of acceptable Y-distance direction coordinates could be, e.g., 14-18 inches.

The reading device 10 ranks the placement instructions it provides to the user based on the type of the coordinate that needs adjusting and the magnitude of the coordinate differential. Additionally, the user is not instructed to adjust the placement of the reading device with regard to the coordinates whose current reading values falls within the acceptable range. However, for coordinates whose current reading values fall outside of the acceptable range, the reading device instructs the user on how to readjust the placement of the device 10. Numerous ways of ordering the instructions exist. In some embodiments, the magnitude of the coordinate differential determines the ordering, with the user first being instructed on proper device 10 placement with regard to the coordinate differential that is largest. In other embodiments, the type of coordinate that needs readjustment determines the order in which the user is instructed to readjust the reading device placement. For example, in some embodiments, adjustments in the X, Y or Z distance coordinate take precedence to adjustments for X, Y or Z tilt. Within each coordinate category, the instructions are further ranked based on the value of the coordinate differential. Alternatively, within each coordinate category, the instructions are not further ranked, but instead communicated to the user in a random order.

As an example of how user is instructed to change the placement of the device 10, if the captured image contains two unique strings, "2735*$5657" and "4656#%^72," the text-to-text comparison software 36 recognizes that the bottom unique string "2735*$5657" is missing from the captured text file, as described above, and thus input the device 10 is not capturing the bottom portion of the test image 28. In this scenario, the text comparison software communicates to the proper placement recognition software that the bottom half of the test image 28 has not been captured. The proper placement recognition software calculates new placement coordinates reflecting how the reading device must be re-positioned such that the entire image is captured. In this example, the user is instructed to move the reading device further away from the test image in the Y-distance direction, such that the third unique string 54 comes into the reader's 10 field of view 29.

Figure 7:
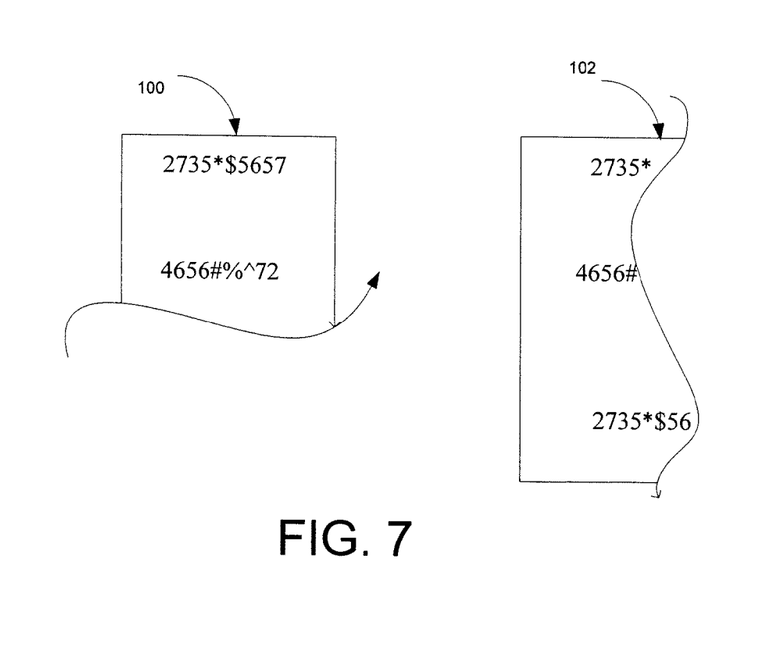
FIG. 7 is a diagram depicting images captured with a reading device.

Referring now to FIG. 7, if the captured image 100 contains part if the unique strings, the right hand portion of the test image 28 has not been captured. In this scenario, after text recognition is performed, the proper placement recognition software calculates how many inches to the right the reading device 10 should be moved such that the captured image includes the full length of the unique strings. For example, because moving the reading device 4 inches to the right in the X-distance direction accomplishes this, the device 10 instructs the user to do so.

Once the proper placement recognition software 34 determined the new placement coordinates, these coordinates are communicated to the user, as some examples have already been given. Numerous ways exist to communicate the coordinates. In some embodiments, the coordinates are displayed in a user interface located on the reading device 10. In other embodiments, especially for blind and visually impaired individuals, the coordinates are audibly communicated to the user, with the user hearing the coordinates through the speakers 24 (FIG. 1). In this approach, proper placement recognition software 34 in the reader 10 sends messages to text to speech software 38 to produce signals that audibly convey the instructions to the user.

In some embodiments, the reading device 10 tells the user how much of the test image 28 is captured in the field of view 29 or how much of the test image 28 is missing. For example, the reading device 10 can state, "you are not capturing the bottom half of the test image" or "you are not capturing the top half of the test image." In other embodiments, the user is instructed how many units of measurement in the X, Y, Z distance or tilt direction the device 10 should be moved. These instructions are sometimes referred to as the field of view report. In some examples, the field of view report includes the percentage of the test image 28 that is within the field of view 29. In one example, the reader 10 states "45% of the test image is within the field of view." In other examples, the field of view report informs the user that the reader 10 is capturing a maximum amount of the test image 28. In this example, the reader states, "I have just told you how much of the page fills up my field of view. Bigger is better, but it's hard to get more than about 70% before the page gets outside my field of view." In this example, if the field of view included 70% of the page, the user would be successfully trained and would exit the training mode 80 (FIG. 5).

In other embodiments, the user is trained on proper placement of the device through physical or audible cues, such as a series of beeps or vibrations. For example, when the device first enters training mode the user is alerted that if the reading device is too far away from the test image 28 in the Y-direction that a high pitched beep sounds. Or alternatively, the user is informed that the beep will become louder. The further the reading device is moved from the test image in the Y-direction, the more high pitched the sound becomes or the louder. Analogously, the closer to the image 28 in the Y-direction the user moves the device 10 the softer and/or less high pitched the sound becomes.

Additional Attributes of the Test Image

Once the reading device 10 is properly positioned such that a large part of the test image 28 is within the field of view, the test image 28 permits additional functionality. For example, processing of the test image 28 by the proper placement recognition software 34 can be used to alert a user of a dirty lens or if a high amount of glare present on the test image 28. As was shown in FIG. 3, in addition to containing the unique strings, the test image 28 also contains words or sentences 62, or a combination of both. In some embodiments, these words and sentences 62 are located between the unique strings. This ensures that if the unique strings are within the field of view, then the words and sentences are also within the field of view. The reading device 10 performs text recognition on the words and sentences. For example, the reader 10 correctly performs text recognition on "the cat ran," but cannot read "across the street," due to an obstruction over the lens. Perhaps, the lens is scratch or has a piece of debris thus precluding text recognition. In such situations, the reading device alerts the user to situation. In some embodiments, the reading device states "please clean your lens" or "please check that no debris is covering the lens."

In some examples, the words and sentences are of varying font size to ensure that the reader is performing text recognition properly. For example, referring to FIG. 3, the words "The cat ran across the street" is font size 12 and the words "FIVE TIMES" is font size 18. If the reader successfully performs text recognition on "FIVE TIMES," but is unable to read "The cat ran across the street," the user is alerted to the situation. In some embodiments, even though all of the unique strings are within the field of view, the reading device is too far away from the test image 28 to correctly read small size font. In such a case, the reading device calculates new distance coordinates such that all of the unique strings are within the field of view but text recognition is successfully be performed.

In some examples, the test image 28 has a glossy finish, thus producing glare under certain light conditions. To help to counteract the glare, polarizers are installed on the reading device 10 to improve performance in reading a test image 28 with a glossy image as described in patent application Ser. No. 11/689,569 and incorporated herein by reference.

Figure 8:
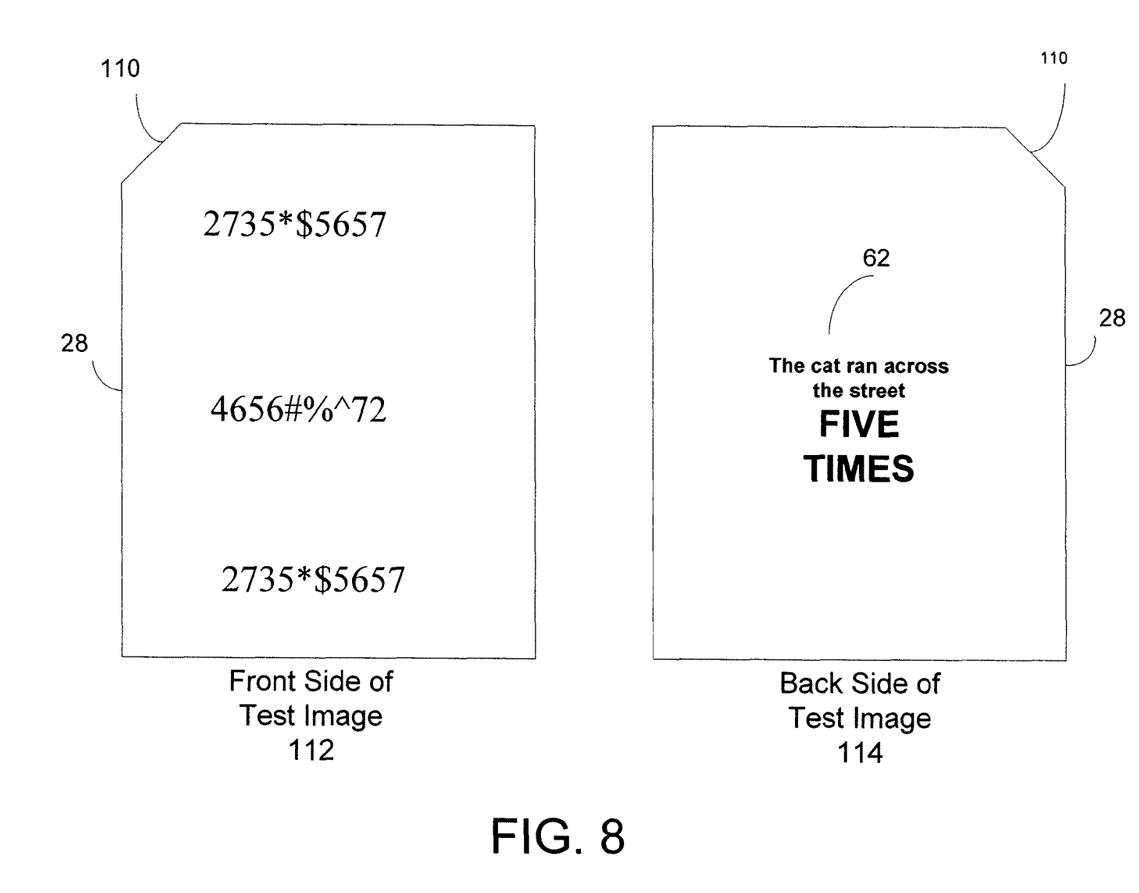
FIG. 8 is an example test image.

Referring to FIG. 8, different sides 112, 114 of the test image 28 contain different portions of the training text. For example, one side 112 of the test image 28 contains the unique strings that ensure that a large portion of the test image is within the field of view and the other side 114 of the test image, contains the words and sentences 62 that ensure that the lens is neither obstructed nor scratched and that text recognition is properly performed. In some examples, the test image 28 has an identifying mark, thus signaling whether the side of test image facing the device 10. In one example, one corner 110 of the test image 28 is cut off and the positioning of the cut off corner 110 indicates the type of information located on the front facing side of the image 28. For example, the cutoff corner 110 located on the upper-left hand side of the test image 28 indicates that the unique strings are located on the front facing side of the test image 28. Analogously, the cutoff corner 110 located on the upper-right hand side of the image 28 indicates that the words and sentences are located on the front facing side of the image 28.

Amongst other things, the cutoff corner 110 provides an additional indicator to the device 10 to enter training mode. That is, instead of or in addition to performing text recognition on the first encountered string, the reading device would locate the borders of the captured image. If the reading device 10 detects that one of the corners of the page is missing, then the reading device enters teaching mode. Additionally, once it has entered teaching mode, the reading device uses the positioning of the identifying mark to determine whether the unique string page or the words and sentences page is facing it, thus allowing the reading device to efficiently perform teaching. For example, if the cutoff corner 110 is in the top right of the test image 28, the reading device 28 is informed that the words and sentences page is in front of it. As such, it will not try and match the first encountered string to one of the unique strings. Instead, it will perform text recognition on the words and sentences.

Other arrangements are possible. A number of embodiments of the invention have been described. Nevertheless, it will be understood that various modifications may be made without departing from the spirit and scope of the invention.

What is claimed is:

1. A method executed in a reading machine, the method comprising:
   comparing by the reading machine a received image of a test page to a known image of the test page stored in the reading machine, with the test page having unique information, by:
      performing text recognition on the captured image; and
      comparing text of the captured image to text of the known image;
      computing by the reading machine differences in text recognized in the received image compared to the known image; and
   calculating by the reading machine a new placement of an image input device that provides the received image to the reading machine relative to the test page such that the received image of the test page better approximates the known image, with the new calculated placement of the reading machine includes an angle of tilt of the reading machine in at least one of X, Y, or Z directions.

2. The method of claim 1, further comprising:
   producing an indication to inform the user of the new placement of the image input device that provides the received image to the reading machine.

3. The method of claim 2 further comprising:
   determining an order to inform the user of the placement by at least one of a type of difference or a magnitude of difference between the captured image and the known image.

4. The method of claim 1 wherein the reading machine is a portable reading machine carrying the image input device, and as the user adjusts the placement of the portable reading machine the portable reading machine calculates subsequent placements until an actual placement provides a received image that substantially matches the known image.

5. The method of claim 1 wherein the reading machine automatically detects that it is in teaching mode.

6. The method of claim 1 wherein the new calculated placement of the reading machine comprises coordinates relative to the known image in at least one of X, Y, or Z planar fields.

7. The method of claim 1 wherein the tilt of the reading machine is determined using an accelerometer.

8. The method of claim 1 wherein the known image is at least comprised of words of different sizes.

9. The method of claim 1 wherein the known image is at least comprised of strings of numbers.

10. The method of claim 9 wherein the strings of numbers are located at a top, middle, and bottom of the known image.

11. The method of claim 10 further comprising:
    recalculating placement until the captured image includes the strings of numbers at the top, middle and bottom of the captured image.

12. The method of claim 1 wherein if text recognition cannot be performed on part of the captured image, the reading machine provides an indication to the user to check a condition of a lens on the reading machine.

13. A computer program product tangibly embodied on a computer readable storage device for training a user on a reading machine, the computer program product comprising instructions for causing the reading machine to:
    compare a received image of a test page to a known image of the test page stored in the reading machine, with the test page having unique information, by instructions to:
       perform text recognition on the captured image; and
       compare text of the captured image to text of the known image; and
    compute differences in text recognized in the received image compared to the known image; and
    calculate a new placement of an image input device that provides the received image to the reading machine such that the received image of the test page better approximates the known image, with the new calculated placement of the reading machine includes an angle of tilt of the reading machine in at least one of X, Y, or Z directions.

14. The computer program product of claim 13, further comprising instructions to:
    render an indication to inform the user of the new placement of the reading machine.

15. The computer program product of claim 13, further comprising instructions to:
    determine an order to inform the user of the placement by at least one of a type of difference or a magnitude of difference between the captured image and the known image.

16. The computer program product of claim 13 wherein the known image is at least comprised of strings of numbers located at a top, middle, and bottom of the known image.

17. The computer program product of claim 13, further comprising instructions to:
    recalculate placement of the reader until the captured image includes the strings of numbers at the top, middle and bottom of the captured image.

18. The computer program product of claim 13 wherein if text recognition cannot be performed on part of the captured image, the computer program product produces an indication to advise the user to check a condition of a lens on the reading machine.

19. A portable reading machine comprising:
an image input device for capturing images;
a computing device coupled to the image input device, the computing device, comprising:
a processor to execute instructions; and
a computer program product residing on a computer readable medium, the computer program product comprising instructions for causing the processor to:
process the captured images to:
compare at least one of the captured images of a test page to a known image of the test page stored in the reading machine, by instructions to:
perform text recognition on the captured image; and
compare text of the captured image to text of the known image; and
in text recognized in the captured image compared to the known image; and
calculate new placement information of the reading machine relative to the test page such that the captured image better approximates the known image, with the new calculated placement of the reading machine includes an angle of tilt of the reading machine in at least one of X, Y, or Z directions.

20. The reading machine of claim 19 wherein the computer program product comprises instructions to:
inform a user of the calculated placement information.

21. The reading machine of claim 19 wherein the information is placement coordinates and the computer program product comprises instructions to:
calculate current placement coordinates of the reading machine relative to the known image; and
render instructions to inform the user of the calculated placement coordinates in an order determined by at least one of a type of difference or a magnitude of difference between the captured image and the known image.

22. The reading machine of claim 19 wherein the computer program product comprises instructions to:
automatically detect that the reading machine is in training mode.

23. The reading machine of claim 22 wherein the known image is provided from capturing the image from a glossy, laminated sheet containing strings of characters, the strings of character located at a top, middle, and bottom of the laminated sheet.

24. The reading machine of claim 19 wherein the test page and the known image are at least comprised of strings of characters, the strings of characters located at a top, middle, and bottom of the known image.

25. The reading machine of claim 24 wherein the computer program product further receives instructions to:
recalculate the placement coordinates until the captured image includes the strings of numbers at the top, middle and bottom of the captured image.

26. The reading machine of claim 24 wherein the computer program product further receives instructions to:
recalculate the placement coordinates by determining if the numbers at the top, middle or bottom of the known image are missing from the captured image.

27. The reading machine of claim 19 wherein the computer program product further comprises instructions to:
recalculate the placement coordinates, if text recognition cannot be performed on part of the captured image, such that the captured image includes more of the known image.

28. The reading machine of claim 19 wherein if text recognition cannot be performed on part of the captured image, the reading machine produces an indication to advise the user to check a condition of a lens on the reading machine.

29. The reading machine, of claim 19 further comprising the test page with the test page being:
a sheet, having at least three strings of numbers printed across spaced portions of a top, middle and bottom of one surface of the page and strings of characters of different sizes printed across the opposing surface of the page and with one corner of the page diagonally cut off.

* * * * *